June 21, 1949.    O. WELSH    2,473,668
ELECTRIC RESISTANCE WELDING METHOD
Filed July 15, 1947
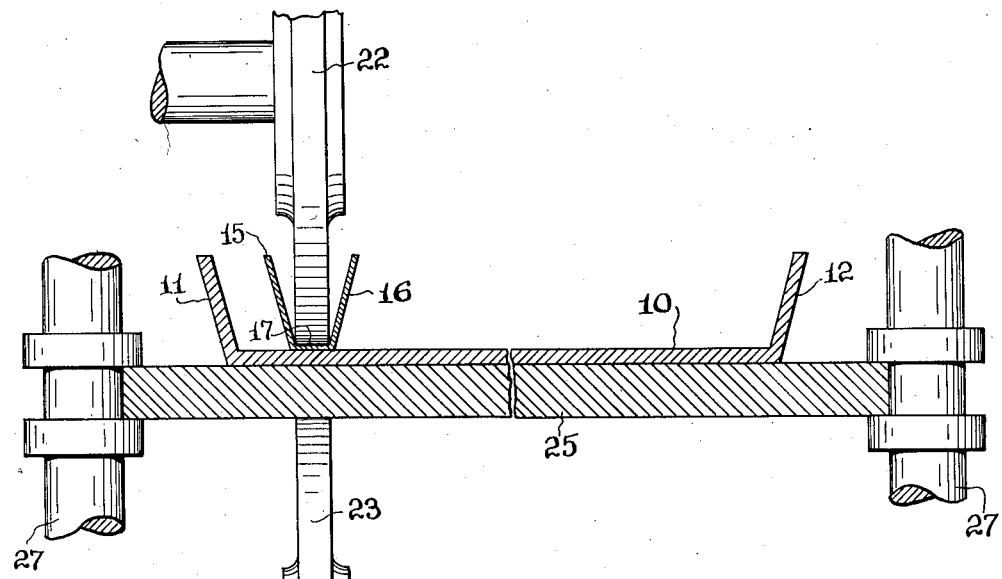
FIG. 3
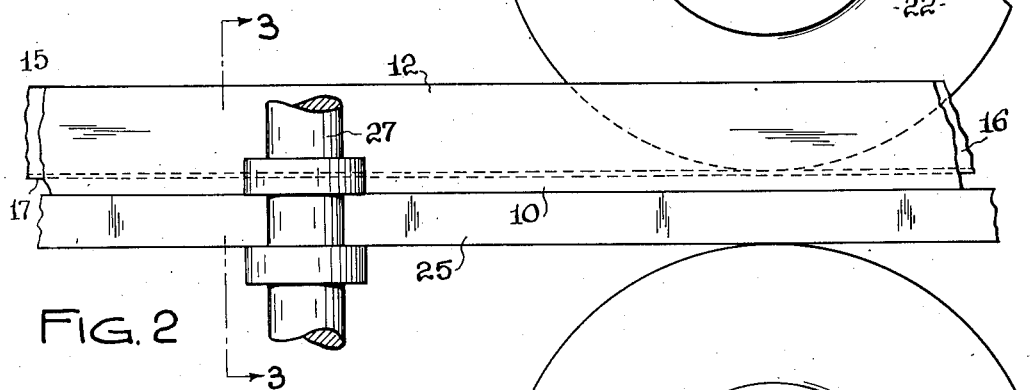
FIG. 2
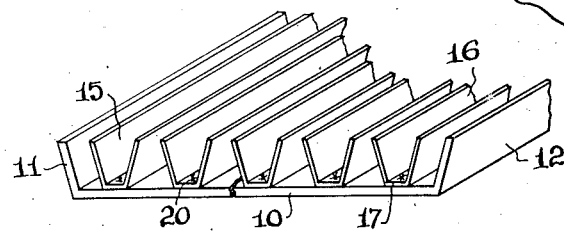
FIG. 1
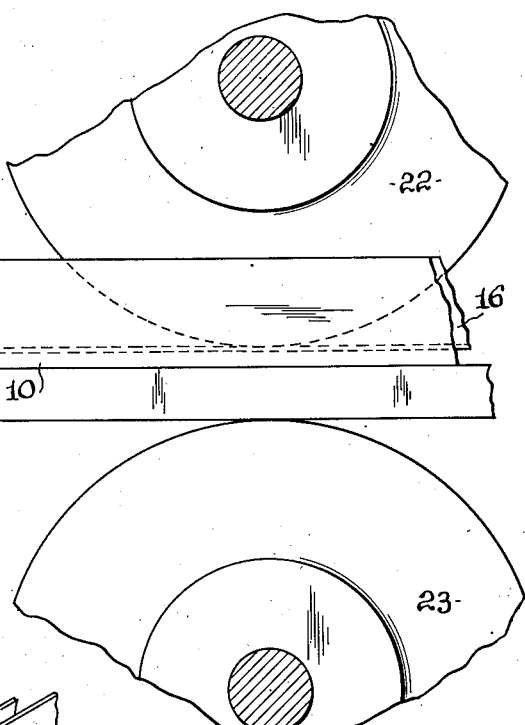
INVENTOR.
ORAL WELSH
BY
Bosworth & Sessions
ATTORNEYS.

Patented June 21, 1949

2,473,668

UNITED STATES PATENT OFFICE 2,473,668

ELECTRIC RESISTANCE WELDING METHOD

Oral Welsh, Elyria, Ohio, assignor to Brown Fintube Company, Elyria, Ohio, a corporation of Ohio Application July 15, 1947, Serial No. 761,098

1 Claim. (Cl. 219—10)

This invention relates to a method for welding fins and like thin steel members to a thicker steel plate or sheet, and more particularly to a method for welding channel section fins to plates by a series of resistance welds formed during continuous relative motion of the fin and plate with respect to opposed roller welding electrodes.

In attempting to weld fins and like members to one side of a steel plate by means of conventional seam welding machines embodying roller electrodes difficulties frequently are incurred because the plate is burned and pitted on the side opposite the fins as a result of the concentration of welding current where one of the electrodes engages the plate. Furthermore the one electrode became fouled with material picked up from the plate requiring a time consuming operation to restore it to its original condition. According to the present invention, the above and other difficulties are eliminated and the welding operation is carried out expeditiously and efficiently in a conventional seam welder embodying vertically aligned roller electrodes by placing a plate of copper or other material of like softness and electrical properties against the side of the steel sheet or plate opposite the fin; the plate is engaged by one roller electrode while the fin is engaged by an opposite roller electrode. Current passes from one to the other electrode through the copper and the two steel pieces. The steel plate and the copper plate cooperate to provide a large contact area between them through which the welding current flows, eliminating excessive concentration of electric current and heat at the region of the weld on the side of the plate opposite the fin. Burning and pitting of the underside of the plate are thus effectively prevented as the fin, steel plate and copper plate are moved as an assembly between a pair of oppositely disposed resistance welding roller electrodes.

The general object of the invention is to provide an improved method of welding relatively thin steel fin members to thicker plate members without unduly burning or pitting the plate member along the region of the welds. Another object is the provision of such a method which can be carried out in a conventional seam welder having two substantially identical roller electrodes. A still further object of the invention is to provide such a method in which the fin, plate and a copper backing plate are moved continuously as an assembly relative to a pair of roller electrodes during a substantially continuous welding operation. Other objects of the invention will become apparent from the following description and the attached drawing. The novel features of the invention are summerized in the claim.

In the drawings: Figure 1 is a perspective of a group of fins welded to a plate in accordance with the present invention; Figure 2 is a side elevation showing an assembly of fin, steel plate and copper backing plate between the roller electrodes used in the welding operation and Figure 3 is a section through Figure 2 as indicated by the lines 3—3 thereon.

Referring now to Figure 1 there is illustrated one form of structure whose parts may be welded together by the method of the present invention, although it will be apparent other shapes may be secured together in like manner within the scope of this invention, which is limited solely by the appended claim. The assembly illustrated comprises a plate 10 as part of a steel channel unit including sides 11 and 12 forming the exterior wall of a conduit of a heat exchanger as shown and described in copending application Serial No. 740,598, in the name of John W. Brown, Jr., and assigned to my assignee. Inside of the channel shaped portion and secured to the flat bottom thereof are a series of sheet steel heat conducting fins 15 in the form of channels having flanges 16 and bottoms 17. Complementary faces of each of the bottoms 17 and of the plate 10 are secured together by a series of resistance welds 20 (Figure 1).

The welds 20 are formed as a series by the use of continuously rotating vertically aligned roller electrodes 22 and 23 mounted on parallel axes and adapted to clamp between them with appropriate resilient welding pressure a fin 15 and a plate 10 as shown in Figures 2 and 3. Interposed between the exterior surface of the plate 10 and the electrode 23 is a copper plate 25 that forms no part of the completed and welded unit but is used as a tool in conjunction with the rollers 22 and 23, properly to distribute current to the region of the welds.

As an example of a procedure which I have found to be satisfactory in welding low carbon steel channel section fins 15 of a thickness of about .031 inch to a low carbon steel twelve gauge plate 10; the base of a channel member and the copper plate 25 on the opposite side of it are engaged with electrodes 22 and 23 each having a width approximately equal to the width of a channel base with an electrode pressure of 900 to 1000 pounds. The current employed is alternating current at about 12,000 amperes and six to eight volts. Each weld is made with a duration of current of three cycles of sixty cycle, single phase, alternating current, the current being shut off for a period of three cycles between welds. The fins are welded to the plate at a speed of eighteen to twenty feet per minute. Under these conditions the side of the plate 10 opposite the fin is only slightly discolored and is not unduly pitted or weakened.

The fins 15, plate 10 and copper plate 25 are held as an assembly with respect to each other by any suitable clamping means and the assembly is guided between the electrode rollers 22 and 23 by engagement of the edges of the plate 25 with three pairs of grooved rollers 27. The manner of supporting and guiding the assembly is illustrative only and is not to be regarded as limiting the scope of the invention. During the welding operation the rollers 22 and 23 are urged toward each other with the appropriate welding pressure to clamp between them the base 17 of the fin 15, the plate 10 and the copper plate 25.

The welding pressure used is sufficient to force the plate 10 and the soft copper plate 25 together in firm electrical contact over a relatively large area, much greater than the area that would be afforded by the line contact between an electrode roller and the stiff plate 10 if no copper plate 25 was interposed between them. The copper plate is an excellent conductor and current may travel between steel plate 10 and copper plate 25 throughout a substantial area; this distribution of current eliminates concentration of the current and provides a path of low resistance. As a result the outer surface of the plate 10 in contact with the copper plate 25 does not become heated to a sufficiently high temperature to be pitted or otherwise deformed with resultant destruction of the desired finished surface.

Current travels between the copper plate 25 and the welding electrode 23 in such manner that there is no appreciable harmful effect on the surface of either. This is partly because the electrode is in continuous rolling motion over the copper and the current is always passing from one to the other over a constantly changing path so that no part of the plate becomes unduly heated. Furthermore the copper, being relatively soft, deforms under the pressure of the electrodes more than the steel plate would and the area of contact between the electrode and the copper plate is increased by this deformation, thus reducing the resistance to flow of current between the electrode and the copper plate and minimizing the heating effect.

After an assembly comprising a fin, plate 10 and copper plate 25 has been moved between the pair of roller welding electrodes from one end to the other, a succeeding fin is clamped in place against the plate 10 and the assembly is moved transversely with respect to the electrode roll so that the electrode rolls will traverse the region in which the series of welds between the succeeding fin and the plate are to be made. In most cases, and particularly when the adjacent fins are parallel to each other, one fin will be welded in place as the assembly traverses the rollers in one direction and the succeeding fin will be welded in place during the return travel of the assembly.

From the foregoing description it will be evident that I have provided an improved method of welding together relatively thin fins and sheets without causing any burning or pitting of the exposed surfaces where the welding current leaves the assembly. My method can be carried out in any conventional seam welder of appropriate capacity and embodying aligned electrode rolls, without requiring expensive additional equipment. The method can be carried out rapidly at relatively low cost, thus making possible the rapid and economical production of finned plates and the like.

Those skilled in the art will recognize that the method set forth in the appended claim may be practiced with apparatus embodying differences over that shown herein without departing from the scope of this invention.

I claim:

The method of resistance welding a relatively light gauge, elongate, channel section, steel finned member to a relatively stiff heavy gauge steel plate member in a seam welder having a pair of substantially identical electrode rolls disposed in substantially the same plane by a series of resistance welds, which includes the steps of positioning a relatively soft and highly current conductive metal plate against one face of said steel plate member to provide a substantial area of contact between the adjacent surfaces of each and positioning said elongate member against the opposite face of said plate member, positioning one electrode roll of said welder against said elongate member and the other electrode roll of said welder against said current conductive metal plate in position to make rolling contact with the outer face of said elongate member and said current conductive metal plate, respectively, urging said electrodes toward each other with pressure sufficient to deform said current conductive metal plate to cause it to conform to said steel plate member and to provide substantial areas of electrical contact between said current conductive plate and said steel plate member and the adjacent electrode roll, respectively, moving said electrode rolls and the assembly made up of said finned member and said plate member relative to each other to cause the electrode rolls to traverse the region to be welded and passing a welding current from one electrode roll to the other through said assembly to form a line of resistance welds between the finned member and plate member without substantially damaging said plate member opposite the welds.

ORAL WELSH.

REFERENCES CITED

The following references are of record in the file of this patent:

UNITED STATES PATENTS

| Number | Name | Date |
| --- | --- | --- |
| 1,001,049 | Knipe | Aug. 22, 1911 |
| 2,263,038 | Heim | Nov. 18, 1941 |
| 2,304,976 | Watter | Dec. 15, 1942 |

FOREIGN PATENTS

| Number | Country | Date |
| --- | --- | --- |
| 877,233 | France | Sept. 1, 1942 |